United States Patent [19]

Ferrieu

[11] Patent Number: 4,827,472
[45] Date of Patent: May 2, 1989

[54] ECHO CANCELLER USING DELTA MODULATION

[75] Inventor: Gilbert M. M. Ferrieu, Bievres, France

[73] Assignee: Telecommunications Radioelectriques et Telephoniques T.R.T., Paris, France

[21] Appl. No.: 764,161

[22] Filed: Aug. 9, 1985

[30] Foreign Application Priority Data

Aug. 17, 1984 [FR] France .................................. 84 12916

[51] Int. Cl.$^4$ ............................................... H04B 3/23
[52] U.S. Cl. ..................................... 370/32.1; 379/410
[58] Field of Search ................ 179/170.2, 170.6, 170.8; 370/32, 32.1; 379/406, 407, 409, 410, 411

[56] References Cited

U.S. PATENT DOCUMENTS

| | | | |
|---|---|---|---|
| 3,975,686 | 8/1976 | Appel | 375/30 |
| 4,024,358 | 5/1977 | Virupaksha | |
| 4,232,400 | 11/1980 | Yamamoto et al. | 370/32.1 X |
| 4,355,214 | 10/1982 | Lévy et al. | 370/32 |
| 4,386,236 | 5/1983 | Ferrieu et al. | 379/390 |
| 4,386,430 | 5/1983 | Treiber | 375/14 |
| 4,672,665 | 6/1987 | Nagai et al. | 379/411 |

OTHER PUBLICATIONS

S. Tanaka et al., "A Multichannel Echo Canceller System", NEC Research & Development, No. 49, Apr. 1978, pp. 58–64.

Primary Examiner—Jin F. Ng
Assistant Examiner—Randall S. Vaas
Attorney, Agent, or Firm—Thomas A. Briody; Jack E. Haken; Anne E. Barschall

[57] ABSTRACT

An echo canceller designed to cancel an echo signal [g(t)] generated in a send path (7) by a signal [f(t)] applied to a receive path (1) contains a subtractor (9) whose positive terminal receives a signal derived from the echo signal and whose negative terminal receives the output signal from a transversal filter (10) provided with means (12) for adjusting the filter coefficients in such a way that the component due to the echo signal is cancelled at the output of the subtractor (9).

This echo canceller comprises a delta encoder (14) for encoding at a sampling rate 1/T the signal f(t) entering the receive path (1) and for supplying at the input of the transversal filter (10) a delta-encoded signal ($\Delta F_n$), a circuit (22) for forming at the sampling rate 1/T the difference signal ($d_n$) between two consecutive samples of the signal entering the send path (7) and for applying this signal to the positive terminal of the subtractor (9), and finally an integrator (13) connected to the output of the subtractor (9) and supplying the output signal of the send path (7).

21 Claims, 5 Drawing Sheets

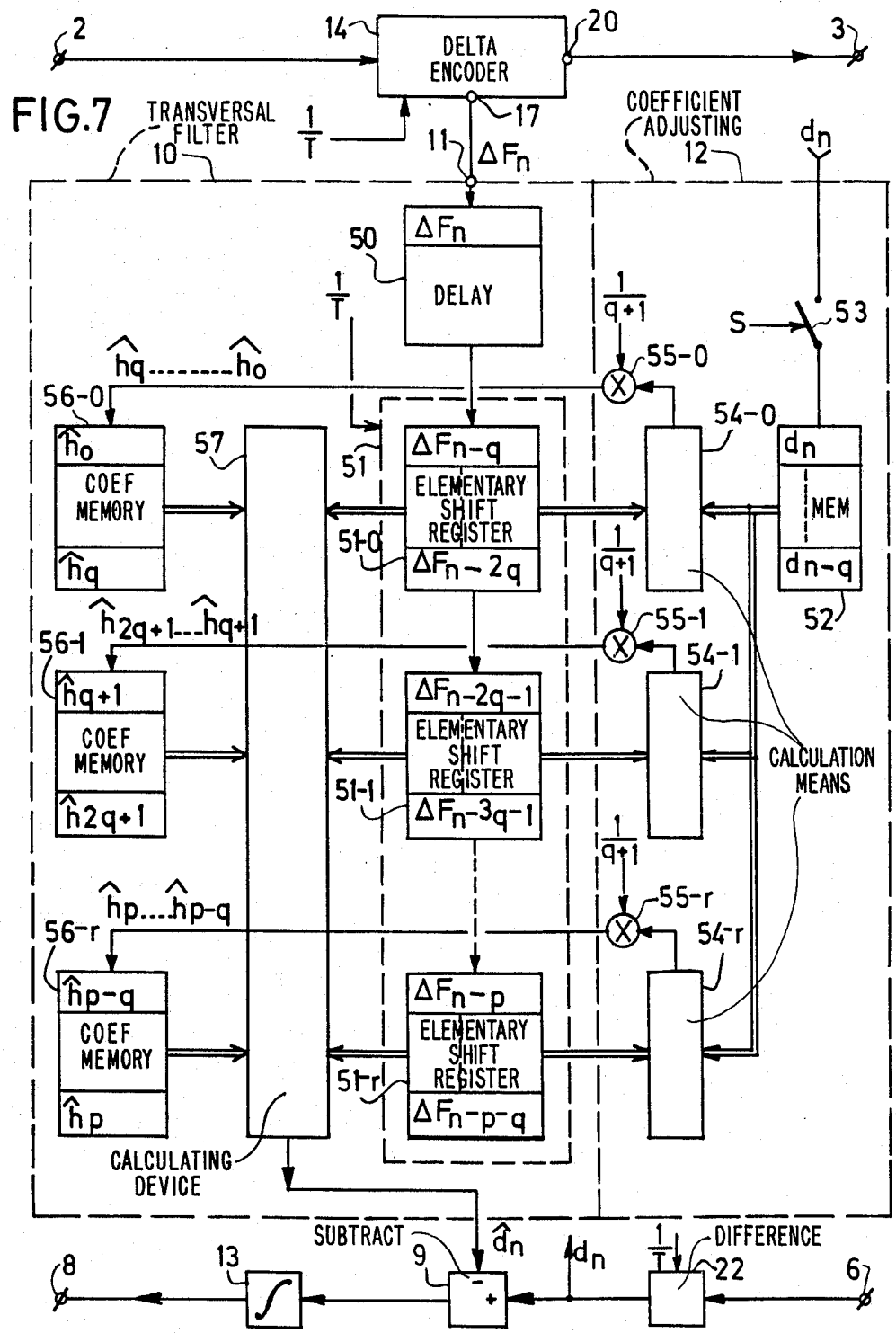

ECHO CANCELLER USING DELTA MODULATION

BACKGROUND OF THE INVENTION

1. Field of the Invention

The invention relates to an echo canceller for cancelling an echo signal generated in a send path by a signal applied to a receive path. Such an echo canceller comprises a subtraction circuit receiving at its first input a signal derived from the signal entering the send path and at its second input the output signal of a transversal filter receiving a signal derived from the signal applied to the receive path. The echo canceller is provided with means for adjusting the filter coefficients so as to cancel the component due to the echo signal in the output signal of the subtraction circuit.

2. The Prior Art

An echo signal may be produced for example by imperfections in a two-wire to four-wire coupling circuit in a telephone exchange for coupling a send path and a receive path together forming a four-wire circuit to a telephone subscriber's line. Another possible origin of an echo signal is to be found in an acoustic coupling between the microphone and the loudspeaker of a telephone set. Whatever its origin, the echo signal produced in the send path may be considered as the response of an echo path to the signal transmitted by the receive path. This parasitic echo signal may interfere with the reception at the location of a distant subscriber, of the useful signal transmitted by the send path. A known method of cancelling the echo is to use a transversal filter connected to the send path and whose coefficients are adjusted in an adjusting circuit in such a way that the response of the filter is as close as possible to that of the echo path, such that by subtraction of the filter output signal from the signal entering the receive path the echo signal is practically cancelled at the output of the receive path.

A limitation to the use of echo cancellers in telephone circuits lies in the complexity of the calculations to be made. It is known that in the transversal filter of the echo canceller it is necessary to perform at each sampling instant a summation of a certain number of samples of the input signal, previously multiplied by coefficients to be adjusted so as to be as close as possible to samples of the impulse response of the echo path. The coefficients of the filter are generally adjusted in accordance with the gradient algorithm, to minimize the mean square value of the signal at the output of the subtraction circuit. This amounts to adjusting coefficients by successive iterations in accordance with an iteration formula described for example in an article by Tanaka et al. entitled "A Multi-channel Echo Canceller System", which appeared in NEC Research and Development, No. 49, April 1978, pages 58–64. According to this algorithm, the value used to adjust each coefficient at each iteration results from multiplication of an error signal sample, constituted by the output signal of the subtraction circuit, by one of the samples of the input signal stored in the filter, and from a division of the product thus formed by the sum of the squares of a certain number of samples of the filter input signal. The filter coefficients have to be determined with precision. Thus the multiplications to be made in the filter and in its adjusting circuit are complex and costly operations, if the signal applied to the filter input and coming from the reception path is PCM-encoded in accordance with a linear law or even in accordance with a pseudo-logarithmic law (A-law or $\mu$-law) as practised at the present time: on this subject, see for example the echo canceller described. In U.S. Pat. No. 4,064,379, in which this patent the analog signal transmitted by the receive path is converted into a pseudo-logarithmic PCM-signal according to the A-law for processing in the echo canceller.

The object of the present invention is to provide an echo canceller in which the calculations to be made in the transversal filter and in its adjusting circuit are considerably simplified compared with those required in known echo cancellers.

In accordance with the invention, an echo canceller intended for cancelling an echo signal generated in a send path by a signal applied to a receive path is characterized in that it comprises:

a delta encoder for encoding, at a sampling rate 1/T, the signal applied to the receive path and for supplying to the input of the transversal filter the bits of the delta-encoded signal, a difference-forming circuit for forming, at said sampling rate 1/T, the difference signal between the values of two consecutive samples of the signal entering the send path and for supplying this difference signal to the first input of the subtraction circuit, and an integrating circuit for integrating the output signal of the subtraction circuit and for applying the integrated signal to the output of the send path.

The output signal of the receive path and applied to the echo path may be the signal applied to this receive path, but preferably this output signal will be supplied by the local decoder present in the delta encoder.

In that case it is advantageous if the signal leaving the receive path is applied to a filter that cuts off the frequencies higher than the upper frequency of the signal band applied to the receive path.

The coefficients of the transversal filter may be adjusted by successive iterations in accordance with the gradient algorithm. In that case the coefficients adjusting circuit of the transversal filter is provided with means for adjusting the coefficients $\hat{h}_i$ by successive iterations at said sampling rate 1/T, in accordance with the iteration formula:

$$\hat{h}_i(n + 1) = \hat{h}_i(n) + e_n \frac{\Delta F_{n-i}}{p + 1}$$

where:
- i is an integer going from 0 to p, pT being the duration of the impulse response of the echo path,
- $h_i(n)$ are the filter coefficients to be adjusted at the instant nT,
- $h_i(n+1)$ are the adjusted filter coefficients utilisable at the instant (n+1)T,
- $e_n$ is the value of the signal supplied by the subtraction circuit at the instant nT, and
- $\Delta F_{n-i}$ are the values of the bits of the delta-encoded signal, stored in the transversal filter and entered into this filter at the instants (n−i)T.

If a variable-step delta encoder is used this may be taken into account by inserting in the output of the transversal filter a multiplier for multiplying by the encoding step while at the same time providing the coefficients adjusting circuit of the transversal filter with means for multiplying the coefficients, formed in accordance with the above-mentioned iteration formula, by $$\left[\frac{\delta f_{n-i+1}}{\delta f_{n-i}} \cdot \frac{\delta f_n}{\delta f_{n+1}}\right]$$

where $\delta f_n$, $\delta f_{n+1}$, $\delta f_{n-i}$, $\delta f_{n-i+1}$ are the respective values of the encoding steps at the instants $nT$, $(n+1)T$, $(n-i)T$, $(n-i+1)T$, the coefficients $\hat{h}_i(n+1)$ resulting from this multiplication being the adjusted coefficients usable at the instant $(n+1)T$.

The coefficients of the transversal filter may also be calculated using a "statistical" method. In this case the coefficients adjusting circuit of the transversal filter is provided with means for calculating the coefficients $\hat{h}_i$ of the filter using the expression $$\hat{h}_i = \frac{1}{q+1} \sum_{j=0}^{q} d_{n-j} \cdot \Delta F_{n-j-i}$$

where:

q is an integer such that $q \angle p$, $d_{n-j}$ are the values of the difference signal supplied by the difference-forming circuit at the instants $(n-j)T$, and $\Delta F_{n-j-i}$ are the values of the bits of the delta-encoded signal stored in the filter and entered into the filter at the instants $(n-j-i)T$.

BRIEF DESCRIPTION OF THE DRAWING

The description that follows in conjunction with the appended drawings, all given by way of example, will elucidate the manner in which the invention may be implemented.

FIG. 7 shows a diagram of the echo canceller in accordance with the invention with a delta encoder of fixed encoding step and a coefficients adjusting circuit using a "statistical" calculation procedure.

DETAILED DESCRIPTION OF THE PREFERRED EMBODIMENT

Figure 1:
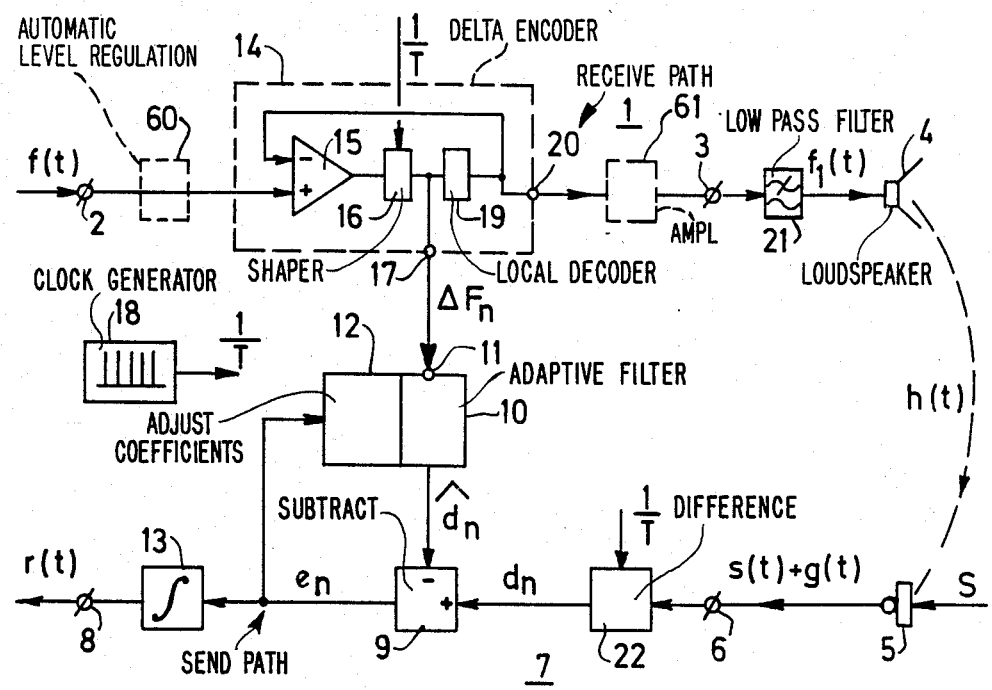
FIG. 1 shows a block diagram of the echo canceller in accordance with the invention with a fixed-step delta encoder and a circuit for adjusting the coefficients by successive iterations.

The echo canceller of the invention, illustrated diagrammatically in FIG. 1, is inserted in the four-wire part of a telephone circuit. This four-wire part comprises a receive path 1 whose input terminal 2 receives a telephone signal f(t) to be transmitted to the receiver of a telephone terminal. In the example given, this receiver is a loudspeaker 4 of a telephone set directly connected to an output terminal 3 of the receive path. This telephone set comprises a microphone 5 serving as the terminal's sender and producing in response to a speech acoustic signal S a useful signal s(t) which is applied to an input terminal 6 of a send path 7, in order to be transmitted to the receiver of a distant subscriber's terminal, via an output terminal 8 of the send path.

For various reasons the signal f(t) applied to the receive path 1 may produce in the send path 7 an inconvenient echo signal g(t) through the intermediary of a parasitic echo path between the output terminal 3 of the receive path and the input terminal 6 of the send path. In the example given, the echo signal is produced by an undesirable acoustic coupling between the loudspeaker 4 and the microphone 5. An echo signal might also be produced at the location of a telephone exchange by imperfections in a coupling circuit between terminals 3 and 6 for coupling the send and receive paths to the telephone line of a subscriber. Whatever its origin, the echo signal g(t) may be superimposed on the useful signal s(t) and disturb reception of this useful signal by the distant subscriber.

To cancel the echo signal g(t) a subtractor 9 is inserted in the send path. The positive terminal of this subtractor receives a signal derived from that applied to the input terminal 6 of the send path. Its negative terminal receives the output signal of an adaptive filter 10 whose input 11 receives a signal derived from the signal f(t) applied to the receive path. The coefficients of the adaptive filter 10 must be adjusted in such a way that the signal supplied by the filter at the negative terminal of the subtractor 9 is a copy as exact as possible of the component that produces the echo signal g(t) in the signal applied to the positive terminal of this subtraction circuit. If the coefficients of the adaptive filter have their ideal values, the echo signal no longer intervenes in the signal supplied by the subtractor 9 and after having been processed in a circuit 13, and depending on the processing effectuated in the send path 7 between the input terminal 6 and the positive terminal of the subtractor 9, there appears at the output terminal 8 of the send path 7 the useful signal s(t) to be transmitted, from which the echo signal g(t) has been removed. In practice a residual echo r(t) may remain on terminal 8 and the quality of the echo cancellation is determined by the ratio r(t)/g(t). The coefficients of the adaptive filter 10 are adjusted in the adjusting circuit 12, starting from the output signal of the subtractor 9. This adjustment is done by successive iterations in accordance with the gradient algorithm, so as to minimize the mean square valve of the output signal of the subtraction circuit, which leads to an iteration formula of the type indicated in the article by Tanaka cited in the foregoing.

In echo cancellers of the known type the adaptive filter 10, generally a digital type, is arranged to process an input signal that is PCM-encoded in accordance with a linear law or a pseudo-logarithmic law, which input signal may directly be that which is sent by the receive path or resulting from an analog-to-digital conversion if the receive path sends an analog signal. To process such a signal with coefficients comprising a relatively large number of bits, the calculations (notably multiplications) to be made in the filter 10 and in the adjusting circuit 12 are complex and expensive to carry out. The present invention makes it possible to remedy this deficiency to a great extent.

The echo canceller of the invention shown in FIG. 1 comprises a delta encoder 14 for encoding the signal f(t) applied to the receive path. In the simplified form shown here, the encoder 14 comprises a comparator 15 which compares the signal f(t) applied to its positive terminal with the locally decoded signal applied to its negative terminal. The difference signal supplied by the comparator is applied to a shaping circuit 16 which supplied at an output 17 of the encoder the bits of the delta-encoded signal, with a sampling rate 1/T provided by a clock generator 18. The encoded signal is applied to a local decoder 19 which supplies the decoded signal applied to the negative terminal of the comparator 15 and is also available at an output 20 of the encoder 14.

The delta-encoded signal appearing at the output 17 of the encoder is applied to the input 11 of the adaptive filter. Its bits assume at a given instant nT (n integer) the value $\Delta F_n$ equal to $+1$ or $-1$.

The signal appearing at the output 20 of the encoder results from an integration in the local decoder 19 of the bits $\Delta F_n$, multiplied by a quantization step $\delta f$. It is supposed that the encoder in the echo canceller of FIG. 1 works with a quantization step $\delta f$ of fixed value. The signal appearing at the output 20 of the encoder "resembles" the signal f(t) applied to the encoder, but it contains noise components from outside the useful band of the signal f(t) which is limited to the upper frequency $F_O$, usually fixed at 3,400 Hz. Connected to the output 20 of the encoder is a low-pass filter 21 whose cut-off frequency is $F_O$, and in this way a signal $f_1(t)$ is obtained at the output of the filter 21 which, apart from the signal to delta-encoding noise ratio is equal to the signal f(t). This signal $f_1(t)$ is used in the loudspeaker 4 of the receiver at the terminal. It may be supposed that the filter 21 is incorporated in the echo path and, for convenience, the figure shows the filter 21 to be situated after the output terminal 3 of the receive path.

The echo canceller of the invention also contains in the send path 7 a difference-forming circuit 22, inserted between the terminal 6 and the positive terminal of the subtractor 9. This circuit 22 samples at the rate 1/T the signal entering the send path and forms at each sampling moment the difference between the values of the two consecutive samples of this signal. It may be now supposed that only the echo signal g(t) is present in the send path, because as in all echo cancellers for telephone circuits the presence of the useful signal s(t) superimposed on the echo signal may give problems which are usually solved with the aid of a doubletalk detector which stops the operation of the echo canceller upon simultaneous detection of the useful signal and the echo signal. If the value of the echo signal at the sampling instant nT and at the preceding instant $(n-1)T$ are called $g_n$ and $g_{n-1}$, the circuit 22 forms at each moment nT a difference signal $d_n = g_n - g_{n-1}$, which may be called the differential echo signal.

The signal $d_n$ supplied by the transversal filter 10 in response to a delta-encoded signal $\Delta F_n$ may therefore be called the estimated differential echo signal and the signal $e_n = d_n - \hat{d}_n$ supplied by the subtractor 9 may be called the residual differential echo signal. This signal $e_n$ is applied to the adjusting circuit 12 where it is used for adjusting the coefficients of the filter 10 as will be explained below. The circuit 13 to which the signal $e_n$ is also applied is an integrator, the function of which is opposite to that of the difference-forming circuit 22 and which thus restores the residual echo signal r(t) on which the useful signal s(t) may be superimposed.

It will now be explained how the echo canceller of the invention, constituted in this way, makes it possible to achieve the practical cancellation of the signal $e_n$ at the output of the subtractor 9 and thus the cancellation of the residual echo signal r(t).

According to the explanations given above, the signal at the output 20 of the delta encoder is the integral of the series:

$$\Delta F_n \cdot \delta f, \ldots, \Delta F_{n+q} \cdot \delta f, \ldots \qquad (1)$$

where $\Delta F_n$, $\Delta F_{n+q}$, ... etc. are the bits of the delta-encoded signal at the moments nT ... (n+q)T ... (with q a positive integer, and $\delta f$ is the fixed-value encoding step.

If h(t) is the impulse response of the echo path comprising all the elements connected between the terminals 3 and 6, the samples of this response at the rate 1/T of the bits of the delta-encoder signal are called $h_O, \ldots, h_i, \ldots h_p$. The integer p is defined such that $h_{p+q}$ is zero for all positive integers q, which amounts to saying that the impulse response h(t) has an effective duration equal to pT.

In the practical case of an operating echo canceller, in which it may be assumed as explained that the useful signal s(t) applied to the send path is zero, the output signal $d_n$ of the difference-forming circuit 22 is equal to the convolution product of the samples of the series (1), whose integral is applied to the echo path, and the samples of the impulse response h(t) of this echo path, i.e.:

$$d_n = \Delta F_n \cdot h_O \cdot \delta f + \ldots + \Delta F_{n-i} \cdot h_i \cdot \delta f + \ldots + \Delta F_{n-p} \cdot h_p \cdot \delta f \qquad (2).$$

Calling $\hat{h}(t)$ the impulse response of the transversal filter 10 and $\hat{h}_O, \ldots \hat{h}_i, \ldots \hat{h}_p$ the samples of this response, generally called filter coefficients, the signal $\hat{d}_n$ leaving the filter may be described as the convolution product of the samples of the delta-encoded signal and these coefficients, i.e.:

$$\hat{d}_n = \Delta F_n \cdot \hat{h}_O + \ldots + \Delta F_{n-i} \cdot \hat{h}_i + \ldots + \Delta F_{n-p} \cdot \hat{h}_p \qquad (3).$$

The signal $e_n$ leaving the subtraction circuit 9 may then be written:

$$\begin{aligned} e_n = d_n - \hat{d}_n = & \\ \delta f [\Delta F_n h_0 + \ldots + \Delta F_{n-i} h_i & + \ldots + \Delta F_{n-p} h_p] + \\ -[\Delta F_n \hat{h}_0 + \ldots \Delta F_{n-i} \hat{h}_i & + \ldots + \Delta F_{n-p} \hat{h}_p] \end{aligned} \qquad (4)$$

In the echo canceller of the invention the coefficients $\hat{h}_i$ of the filter are adjusted in the adjusting circuit 12 so as to cause a quasi-cancellation of the signal $e_n$. The complete cancellation of this signal $e_n$ is achieved when the coefficients $\hat{h}_i$ of the transversal filter are adjusted in such a way that:

$$\hat{h}_i = \delta f \cdot h_i \qquad (5)$$

for all integers i such that $0 \leq i \leq p$.

The transversal filter 10 thus stores, when the echo canceller has converged, coefficients $\hat{h}_i$ equal to the samples $h_i$ of the impulse response of the echo path, multiplied by the encoding step $\delta f$.

Figure 2:
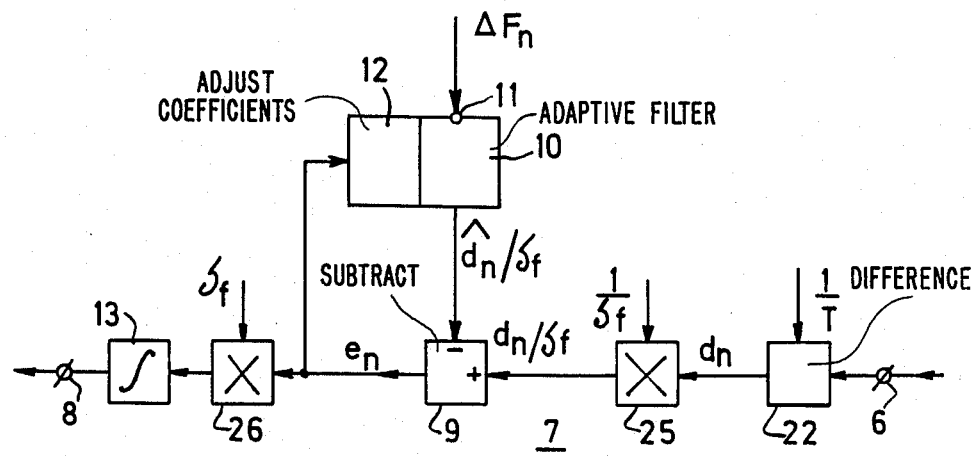
FIGS. 2 and 3 show the modifications to be made to the diagram in FIG. 1 to obtain two variants of the echo canceller in FIG. 1.

It may be noted that these coefficients $\hat{h}_i$ may be equal, after convergence, to the samples $h_i$, if instead of the signal $d_n$ the signal $d_n/\delta f$ is applied to the positive input of the subtractor 9. The necessary modifications for implementing this variant are shown in FIG. 2, which is a partial respresentation of the diagram of FIG.

1, the identical elements of these two figures carrying the same references. FIG. 2 thus shows, interposed in the send path 7, a multiplier 25 which multiplies the signal $d_n$ at the output of the circuit 22 by $1/\delta f$ so as to supply the signal $d_n/\delta f$ to the positive input of the subtractor 9, and a multiplier 26 which multiplies the signal $e_n$ at the output of the subtractor 9 by $\delta f$ so as to supply the signal $e_n \cdot \delta f$ to the input of the integrator 13. The signal $e_n$ is used in the adjusting circuit 12 to adjust the coefficients $\hat{h}_i$ of the transversal filter 10. The latter supplies a signal of the form $d_n/\delta f$ and, upon convergence of the echo canceller, the coefficients $\hat{h}_i$ of the filter are such that: $\hat{h}_i = h_i$.

Cascading the two multipliers 25 and 26 in the send path makes it possible to maintain at the output terminal 8 of this path the level of the useful signal applied to the input terminal 6.

Figure 3:
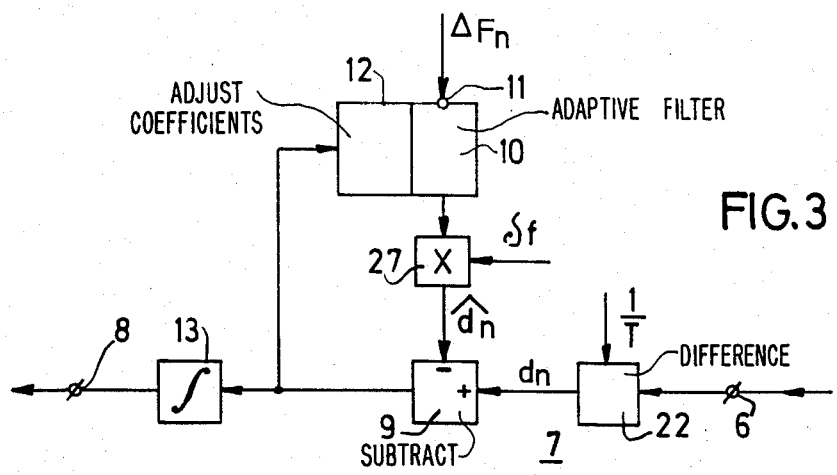

It is also possible to obtain filter coefficients $\hat{h}_i$ such that $\hat{h}_i = h_i$, by interposing, as shown in FIG. 3, a multiplier 27 between the output of the transversal filter 10 and the negative input of the subtractor 9, the rest of the diagram of FIG. 1 remaining unchanged. The multiplier 27 multiplies by $\delta f$ the signal $\hat{d}_n/\delta f$ at the output of the filter 10 so as to supply the signal $\hat{d}_n$.

Finally, it may be noted that if one introduces in the receive path a circuit that multiplies by $A_O$, the signal $d_n$ is multiplied by $A_O$ and the coefficients of the transversal filter 10 tend, after convergence, towards the values $\hat{h}_i = A_O \cdot h_i$ without disturbing the level of the useful signal s(t) in the send path.

To adjust the coefficients $\hat{h}_i$ of the transversal filter 10 so as to cancel the residual differential echo signal $e_n$ supplied by the subtractor 9, one can minimize the mean square value of this signal e(n) by using the gradient algorithm. It is well known, for example from the article by Tanaka already cited, that this procedure, which produces a very rapid convergence of the coefficients $\hat{h}_i$, consists in calculating these coefficients by successive iterations at the rate 1/T in accordance with the general iteration formula:

$$\hat{h}_i(n+1) = \hat{h}_i(n) + e_n \cdot \frac{x_i}{\sum_{i=0}^{p}(x_i)^2} \quad (6)$$

This formula indicates the calculation to be made in order to obtain the value $\hat{h}_i(n+1)$ of a coefficient $\hat{h}_i$ at an instant (n+1)T, starting from the value $\hat{h}_i(n)$ of this coefficient at the instant nT. In the correction term, $e_n$ represents the value of the residual differential echo signal at the instant nT, while $x_i$ represents the value of a sample stored in the transversal filter and entered into the filter at an instant (n−i)T; finally $$\sum_{i=0}^{p}(x_i)^2$$

represents the sum of the squares of the samples entered into the filter during the time pT of the impulse response of the echo path preceding the moment nT.

The iteration formula (6) thus becomes very easy to apply in the case of an echo canceller in accordance with the invention. In fact, each term $x_i$ is simply one of the bits $\Delta F_{n-i}$ of the delta-encoded signal having the value +1 or −1. The term $$\sum_{i=0}^{p}(x_i)^2$$

has the value p+1 and the iteration formula (6) may thus be written:

$$\hat{h}_i(n+1) = \hat{h}_i(n) + e_n \cdot \frac{\Delta F_{n-i}}{p+1} \quad (7)$$

with $\Delta F_{n-i} = \pm 1$.

Thus, in the echo canceller of the invention both the calculations to be made in the transversal filter 10 to obtain the estimated difference signal $\hat{d}_n$ (see formula (3) above) and the calculations to be made in the adjusting circuit 12 for adjusting the filter coefficients (formula (7)) are very simple to carry out because of the fact that the samples $\Delta F_{n-i}$ appearing as product factors in these formulae take only the simple values +1 or −1. In practice, the calculations to be made can be reduced to additions which are easily implemented by analog or digital techniques.

A description will now be given of the possible embodiments of the different elements of the echo canceller in FIG. 1, preferably assuming implementation in integrated circuits in which the parts of the echo canceller that perform the calculation operate on the basis of digitally encoded signals.

The delta encoder 14 may be of any known type familiar to persons skilled in the art and operating with a fixed encoding step, as hitherto assumed.

The difference former 22 may be a differential PCM encoder with a linear response as also known to persons skilled in the art. Such an encoder can supply at the sampling rate 1/T a signal $d_n = g_n - g_{n-1}$ encoded with m bits.

The subtraction circuit 9 may be a digital adder-subtractor of the classic type with m bits.

The integrator 13 proper may be digital summing accumulator which is also well known. To obtain an analog signal at the output 8 of the send path, the accumulator must be followed by a digital-to-analog converter.

Figure 4:
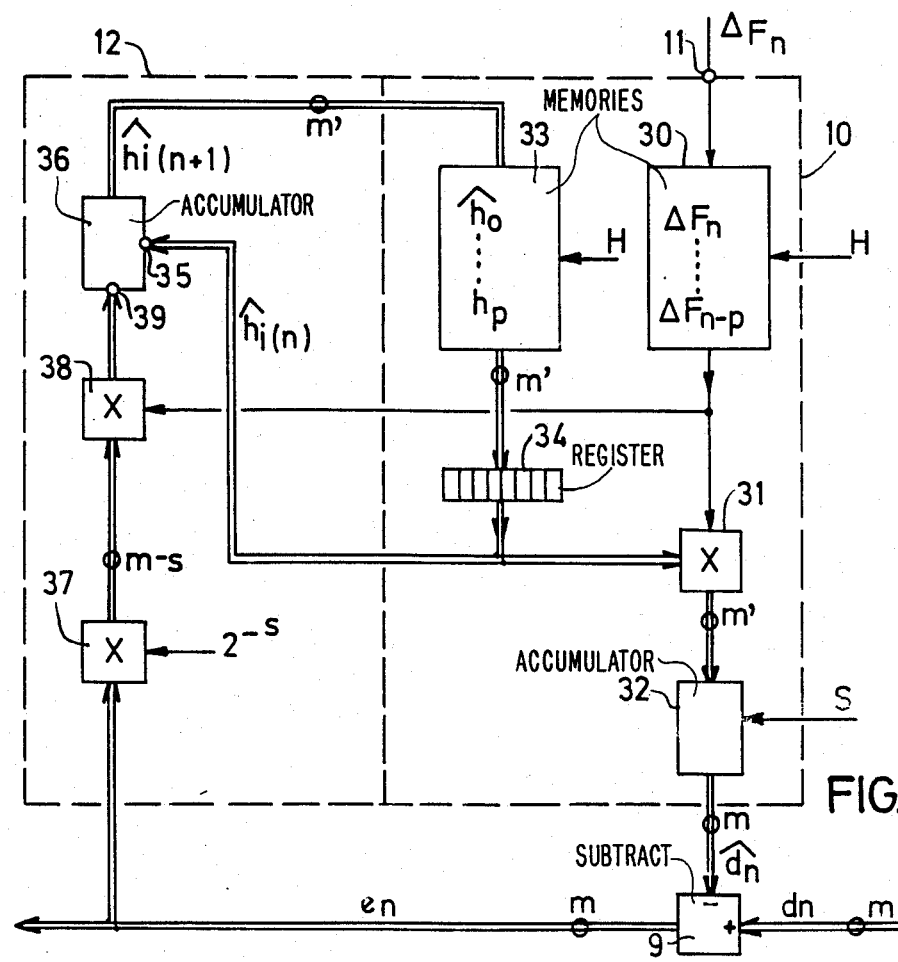
FIG. 4 shows a diagram of an embodiment of the transversal filter and of the coefficients adjusting circuit for the echo canceller in FIG. 1.

FIG. 4 shows a possible embodiment, in a configuration of the series type, for the transversal filter 10 and the filter coefficients adjusting circuit 12. In this figure the links transporting signals of one bit are represented by single lines and those transporting signals of several bits are represented by double lines.

The transversal filter 10 contains a memory 30 receiving from the encoder 14 the delta-encoded signal $\Delta F_n$, whose bits are produced at the rate 1/T. This memory 30 stores, at any instant nT, p+1 bits going from $\Delta F_n$ to $\Delta F_{n-p}$. Upon reception of the command signal H of frequency (p+1)/T, these p+1 bits $\Delta F_n$ to $\Delta F_{n-p}$ appear successively during each sampling period T at the output of the memory 30, in order to be applied to a first input of a multiplier 31. The transversal filter 10 also contains a memory 33 for storing p+1 coefficients $\hat{h}_0$ to $\hat{h}_p$ each formed by m' bits and processed in the adjusting circuit 12, as will be expalined in the following. Upon receipt of the command signal H of frequency (p+1)/T, the coefficients $\hat{h}_0$ $\hat{h}_p$ are read from the memory 33 and, through the intermediary of a register 34 serving as a buffer memory, are fed to the second input of the multiplier 31 such that they appear there in synchronism with the bits $\Delta F_n$ to $\Delta F_{n-p}$ applied to the first input of this multiplier. It is evident that the multiplier 31 can very simply be implemented since it multiplies the coefficients $\hat{h}_o$ to $\hat{h}_p$ by +1 or −1.

During each period T there appear at the output of the multiplier 31 the p+1 products featuring in the second part of equation (3). An accumulator 32, triggered by a command signal of frequency 1/T, accumulates during each period T the products formed by the multiplier 31 and, in conformity with equation (3) supplies the estimated differential echo signal $\hat{d}_n$ at the sampling rate 1/T. This signal $\hat{d}_n$ of m bits is applied to the subtractor 9 in order to be subtracted from the differential echo signal $d_n$ of m bits formed in the send path. The subtractor 9 supplies, at a sampling rate 1/T, the residual differential echo signal $e_n$ of m bits.

The filter coefficients read from the memory 33 and appearing at the output of the register 34 are applied in the adjusting circuit 12 to an input 35 of an accumulator 36, which operates in time-division to adjust successively all the coefficients $\hat{h}_o$ to $\hat{h}_p$ during each period T in accordance with the iteration formula (7). For calculating the modifying terms of these coefficients, a circuit 37 is used which effectuates the division of the signal $e_n$ by p+1. If $p+1=2^s$ is chosen, the circuit 37 is a simple circuit that shifts by s binary positions the m-bit numbers forming the signal $e_n$. The signal $e_n/(p+1)$ of m−s bits supplied by the circuit 37 is applied to a multiplier 38 in order to be multiplied successively during each period T by the p+1 bits $\Delta F_n$ to $\Delta F_{n-p}$ of the delta-encoded signal appearing at the output of the memory 30. At the output of multiplier 38, which is very simple since it makes multiplications by +1 or −1, there appear during each period T the p+1 coefficient modifying terms in conformity with equation (7). These modifying terms are applied to an input 39 of the accumulator 36 in order to be added to the coefficients synchroniously appearing at the other input 35. The adjusted coefficients appear at the output of the accumulator and are written into the memory 33 in order to be used in the same manner, during the following sampling period T, in the filter 10 and in the control circuit 12.

It will be recalled that it has been assumed up to now that a fixed encoding step $\delta f$ is used in the delta encoder 14. With this technique, however, a satisfactory signal-to-encoding-noise ratio can only be obtained for a limited dynamic range of the signal f(t) applied to the input of the encoder, unless of course the sampling rate in the encoder is substantially increased.

Consequently, in the echo canceller according to the invention the use of a delta encoder 14 with a fixed encoding step and a reasonable sampling rate is for all intents and purposes limited to the case where the dynamic range of the signal entering the encoder can be limited. This is what may be envisaged in the use of an echo canceller as represented in FIG. 1, where the signal f(t) entering the receive path has to be heard in a loudspeaker and where the echo canceller serves to avoid the acoustic coupling effect between the loudspeaker 4 and the microphone 5. Numerous experiments have shown that considerable hearing comfort for the user is obtained when the acoustic signals emerging from the loudspeaker have a constant average power (which can be regulated by the user), whatever the level of the signal f(t) entering the receive path. to implement this level regulating function one may use for example a device like that described in U.S. Pat. No. 4,386,236 issued to Ferrieu et al and entitled "Device for automatically regulating the sound level control of telephone station". This device enables the voice signals to keep the dynamic range of variation in speech levels while at the same time virtually cancelling the dynamics linked with variable attenuations of the transmission lines, depending on the connections established. An automatic level-regulating device of this kind may be interposed in the diagram of FIG. 1 at the place represented by the dashed square 60 for processing the signal f(t) entering the receive path and supplying a signal of reduced dynamic range to the input of the delta encoder 14. The latter may then be arranged to work with a fixed encoding step, optimized in order to obtain the best signal-to-encoding-noise ratio. For the utilisation of the echo canceller envisaged in FIG. 1 one may also insert after the output 20 of the encoder 14, at the location represented by the dashed rectangle 61, an amplifier of gain $A_O$ which can be varied by the user. As already explained, the coefficients of the transversal filter 10 of the echo canceller will then adjust automatically to the values $A_O \cdot h_i$, taking into account the introduction of the gain $A_O$ in the echo path.

Apart from the cases of the type envisaged here, it is often necessary to respect the dynamic range of the signal f(t) entering the receive path. As already indicated, the use of a delta encoder with a fixed encoding step does not produce a satisfactory signal-to-encoding-noise ratio at all possible input levels, unless a very high sampling rate is used (of the order of several hundreds of kilohertz) thereby considerably increasing both the volume of calculations to be carried out in a predetermined time interval in the echo canceller and the quantity of information to be stored in the memory for the coefficients $\hat{h}_i$ and the memory for the bits $\Delta F_{n-i}$. It is well known, however, that delta encoders using syllabic compression operate with a variable delta step at a syllabic rhythm that makes it possible to obtain an excellent signal-to-noise ratio, while keeping the sampling rate relatively low (of the order 64 kHz), for an input signal having a dynamic range of nearly 50 dB.

Consider now the case where a variable-step delta encoder is used in the echo canceller of the invention. In a particular case, in which the syllabic variation of the step $\delta f$ is negligible during the period of the impulse response of the echo path and during the convergence time of the echo canceller, the encoding step $\delta f$ may be considered at any given instant to be constant and the echo canceller in FIG. 1 may be used without any other modification with a variable step encoder. For all practical purposes this is the case when the impulse response of the echo path is very short (of the order of a few milliseconds).

In the general case, the echo canceller of the invention has to take account of variations in the encoding step $\delta f$ on the basis of the considerations which follow.

In the echo canceller described so far the difference signal $d_n$ formed in the send path had the expression given by formula (2) with a constant step $\delta f$.

With a variable-step encoder, formula (2) may be written:

$$d_n = \Delta F_n \cdot h_O \cdot \delta f_n + \ldots + \Delta F_{n-i} \cdot h_i \cdot \delta f_{n-i} + \ldots + \Delta F_{n-p} \cdot h_p \cdot \delta f_{n-p}$$

where $\delta f_n, \ldots \delta f_{n-i}, \ldots \delta f_{n-p}$ are the values of the delta step at the instants nT, ... (n−i)T, ... (n−p)T.

We now consider the variant of the echo canceller in FIG. 2 in which the signal applied to the positive terminal of the subtractor 9 is $d_n^1 = d_n/\delta f_n$, instead of $d_n$. This signal $d_n^1$ may be written:

$$d_n^1 = \Delta F_n \cdot h_0 \cdot \frac{\delta f_n}{\delta f_n} + \ldots + \Delta F_{n-i} \cdot h_i \frac{\delta f_{n-i}}{\delta f_n} + \ldots + \Delta F_{n-p} \cdot \frac{\delta f_{n-p}}{\delta f_n} \quad (8)$$

As explained, in this variant with a fixed encoding step the coefficients $\hat{h}_0, \ldots \hat{h}_i, \ldots \hat{h}_p$ of the filter 10 tend towards the ideal values $h_0, \ldots, h_i \ldots h_p$; in other words, when the gradient algorithm is used, consisting for practical purposes of adjusting the coefficients of the filter in accordance with the iteration formula (7), the "target" point of the algorithm upon each iteration is a point $M_O$ having in a space of $(p+1)$ dimensions the coordinates $h_0, \ldots h_i, \ldots h_p$ and is invariable upon each iteration.

This is not the case when the encoding step is variable. It may be derived from formula 8 that upon an iteration defined by the instant nT of the "target" point used with the gradient algorithm is a point $M_n$ with the coordinates $$h_0 \frac{\delta f_n}{\delta f_n}, \ldots h_i \frac{\delta f_{n-i}}{\delta f_n}, \ldots h_p \frac{\delta f_{n-p}}{\delta f_n}.$$

At the next instant $(n+1)T$, one must then have $$d_{n+1}^1 = \Delta F_{n+1} \cdot h_0 \cdot \frac{\delta f_{n+1}}{\delta f_{n+1}} + \ldots + \Delta F_{n-i+1} \cdot h_i \cdot \frac{\delta f_{n-i+1}}{\delta f_{n+1}} + \ldots + \Delta F_{n-p+1} \cdot h_p \cdot \frac{\delta f_{n-p+1}}{\delta f_{n+1}}$$

If we call respectively $X_i(n)$ and $X_i(n+1)$ (with i varying from 0 to p+1), the (p+1) coordinates of the "target" points $M_n$ and $M_{n+1}$, it is easy to see that one goes from $X_i(n)$ to $X_i(n+1)$ by the relation:

$$X_i(n+1) = X_i(n) \times \left[ \frac{\delta f_{n-i+1}}{\delta f_{n-i}} \cdot \frac{\delta f_n}{\delta f_{n+1}} \right] \quad (9)$$

If a variable-step encoder is used in the echo canceller, if the signal $d_n^1 = d_n/\delta f_n$ is formed in the send path in order to form the difference $e_n^1 = d_n^1 - \tilde{d}_n^1$, where $d_n^1$ is the output signal of the transversal filter, and if the coefficients $\hat{h}_i$, of the filter are adjusted in accordance with the gradient algorithm using the iteration formula (7), the brute application of this formula to the iteration defined at the instant nT will give the adjusted coefficients $\hat{h}_i$, $(n+1)$ such that:

$$\hat{h}_i'(n+1) = \hat{h}_i(n) + e_n^1 \cdot \frac{\Delta F_{n-i}}{p+1} \quad (10)$$

These coefficients $\hat{h}_i'(n+1)$ will have to be corrected by the factor:

$$\left[ \frac{\delta f_{n-i+1}}{\delta f_{n-i}} \cdot \frac{\delta f_n}{\delta f_{n+1}} \right]$$

used in formula (9) in order to supply the "true" values $\hat{h}_i(n+1)$ to be used for the following iteration defined at the instant $(n+1)T$, viz.:

$$\hat{h}_i(n+1) = \hat{h}_i'(n+1) \times \left[ \frac{\delta f_{n-i+1}}{\delta f_{n-i}} \cdot \frac{\delta f_n}{\delta f_{n+1}} \right] \quad (11)$$

Finally, the iteration formula to be used in order to obtain upon each iteration the new values of the coefficients may be written:

$$\hat{h}_i(n+1) = \left[ \frac{\delta f_{n-i+1}}{\delta f_{n-i}} \cdot \frac{\delta f_n}{\delta f_{n+1}} \right] \left[ \hat{h}_i(n) + e_n^1 \cdot \frac{\Delta F_{n-i}}{p+1} \right] \quad (12)$$

In order to adjust the coefficients in accordance with the iteration formula (12), an echo canceller using a variable-step delta encoder must therefore, in addition to having the elements shown in the control circuit 12 in FIG. 4, be provided with means for forming and storing the $(p+1)$ last factors $$K_i = \left[ \frac{\delta f_{n-i+1}}{\delta f_{n-i}} \cdot \frac{\delta f_n}{\delta f_{n+1}} \right]$$

and means for multiplying by these factors $K_i$.

These supplementary means may be greatly simplified by taking into account the following considerations. It may be remarked first of all that the variable-step delta encoder to be used does not need to supply at its outputs any information on the magnitude of the encoding step at each instant nT, since the information giving the values $\delta f_n$ of the encoding step is used locally in the echo canceller, on the one hand for forming the signal $d_n^1 = d_n/\delta f_n$, and on the other for forming the factors $K_i$. It is thus possible to locally encode the values of the variable step $\delta f_n$ used in the local decoder 19 of the encoder 14 in such a way that $\delta f_n$ is PCM-encoded in accordance with a linear law. It is thus possible to encode in a simple manner the values of the ratios $$\frac{\delta f_{n-i+1}}{\delta f_{n-i}} \text{ and } \frac{\delta f_n}{\delta f_{n+1}}$$

entering into the calculation of the factors $K_i$, taking into account the fact that these values are very close to 1 since the encoding steps do not vary much from one sampling instant to the next.

The encoding of $$\frac{\delta f_{n-i+1}}{\delta f_{n-i}}$$

may for example be such that, where $\epsilon$ is small with respect to 1:

if $1 - \epsilon \leq \frac{\delta f_{n-i+1}}{\delta f_{n-i}} \leq 1 + \epsilon$ one will take $\frac{\delta f_{n-i+1}}{\delta f_{n-i}} = 1$ if $\frac{\delta f_{n-i+1}}{\delta f_{n-i}} < 1 - \epsilon$ one will take $\frac{\delta f_{n-i+1}}{\delta f_{n-i}} = 1 - \epsilon.$ if $\frac{\delta f_{n-i+1}}{\delta f_{n-i}} > 1 + \epsilon$ one will take $\frac{\delta f_{n-i+1}}{\delta f_{n-i}} = 1 + \epsilon.$ It is evident that this encoding of $$\frac{\delta f_{n-i+1}}{\delta f_{n-i}}$$

also defines for $i=0$ the encoding of $$\frac{\delta f_n}{\delta f_{n+i}}.$$

Preferentially, the local decoder 19 of the encoder 14 will use the step values defined by this mode of encoding $$\frac{\delta f_{n-i+1}}{\delta f_{n-i}}$$

in such a way that the signal appearing at the output 20 of the encoder uses at every moment the same delta steps as those used for adjusting the coefficients $\hat{h}_i$ of the transversal filter 10.

With this mode of encoding, the multiplications by $$\frac{\delta f_{n-i+1}}{\delta f_{n-i}} \text{ and } \frac{\delta f_n}{\delta f_{n+1}}$$

required by the interation formula (10) can be very easily implemented if one chooses $\epsilon = 2^{-x}$, $\epsilon$ being small compared with 1 and thus x large. The multiplication by $1+\epsilon = 1+2^{-x}$ or by $1-\epsilon = 1-2^{-x}$ may in fact be implemented quite simply by adding the multiplicands $$\left[ \hat{h}_i(n) + e_n^1 \cdot \frac{\Delta F_{n-i}}{p+1} \right]$$

and the same multiplicands shifted by x bits towards the right. Thus, adjustment of the coefficients in accordance with the iteration formula (12) only requires this shifting by x bits and a number of additions, without any complex multiplications.

The procedure for adjusting the coefficients with a variable encoding step has been explained above for the case of the variant in FIG. 2 where the signal $d_n^1 = d_n/\delta f_n$ is formed in the send path. The same procedure can be used in the same manner in the case of the variant in FIG. 3 where the signal at the output of filter 10 is multiplied at an instant nT by the encoding step $\delta f_n$. As already explained, in these two variants the coefficients $h_i$ of the filter converge towards the same values $\hat{h}_i$ such that the gradient algorithm uses the same "target" points.

Figure 5:
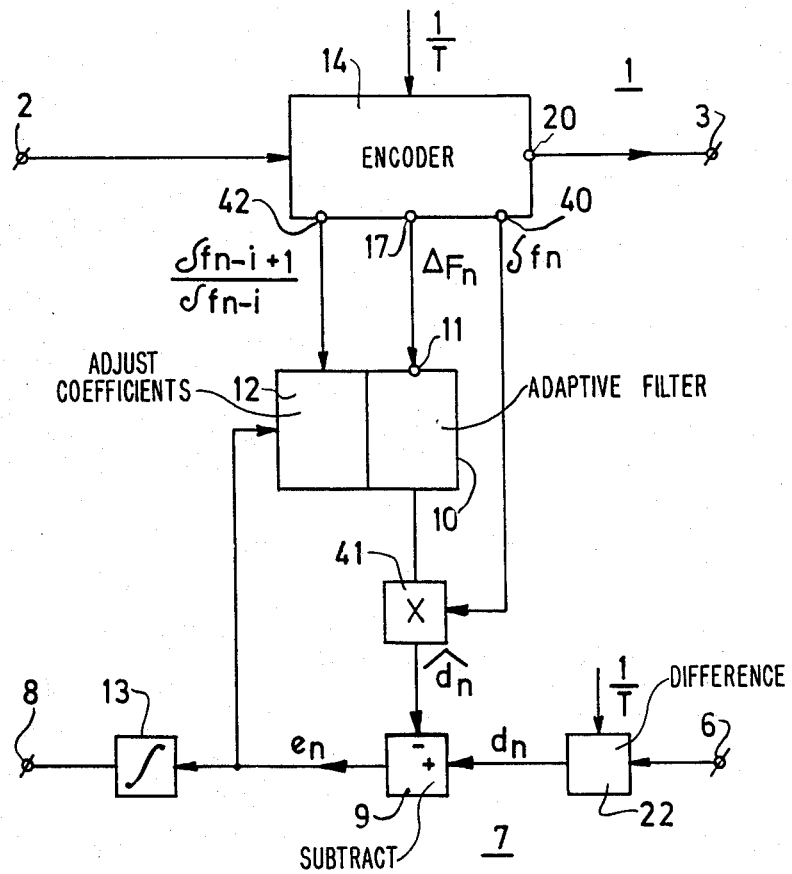
FIG. 5 shows a block diagram of the echo canceller in accordance with the invention with a delta encoder of variable encoding step and a circuit for adjusting the coefficients by successive iterations.

FIG. 5 shows summarily the modifications to be made to the diagram in FIG. 1 to implement an echo canceller with a variable delta encoding step. The figure shows only the elements comprised between the terminals 2 and 3 of the receive path 1 and between the terminals 6 and 8 of the send path 7. The encoder 14 contains, in addition to the output 17 supplying the bits $\Delta F_n$ of the delta encoded signal and in addition to the output 20 supplying the locally decoded signal, a supplementary output 40 at which there appears at each moment nT the value of the PCM-encoded step $\delta f_n$. In accordance with the variant in FIG. 3, this encoded value $\delta f_n$ is applied to a multiplier 41 for multiplying by $\delta f_n$ the signal at the output of the transversal filter 10.

The encoder 14 contains another supplementary output 42 which produces the coded values $$\frac{\delta f_{n-i+1}}{\delta f_{n-i}},$$

as explained, in the form $1 \pm K.2^{-x}$ where $K=0$ or 1. The values $$\frac{\delta f_{n-i+1}}{\delta f_{n-i}}$$

thus encoded are used in the coefficients adjusting circuit 12.

Figure 6:
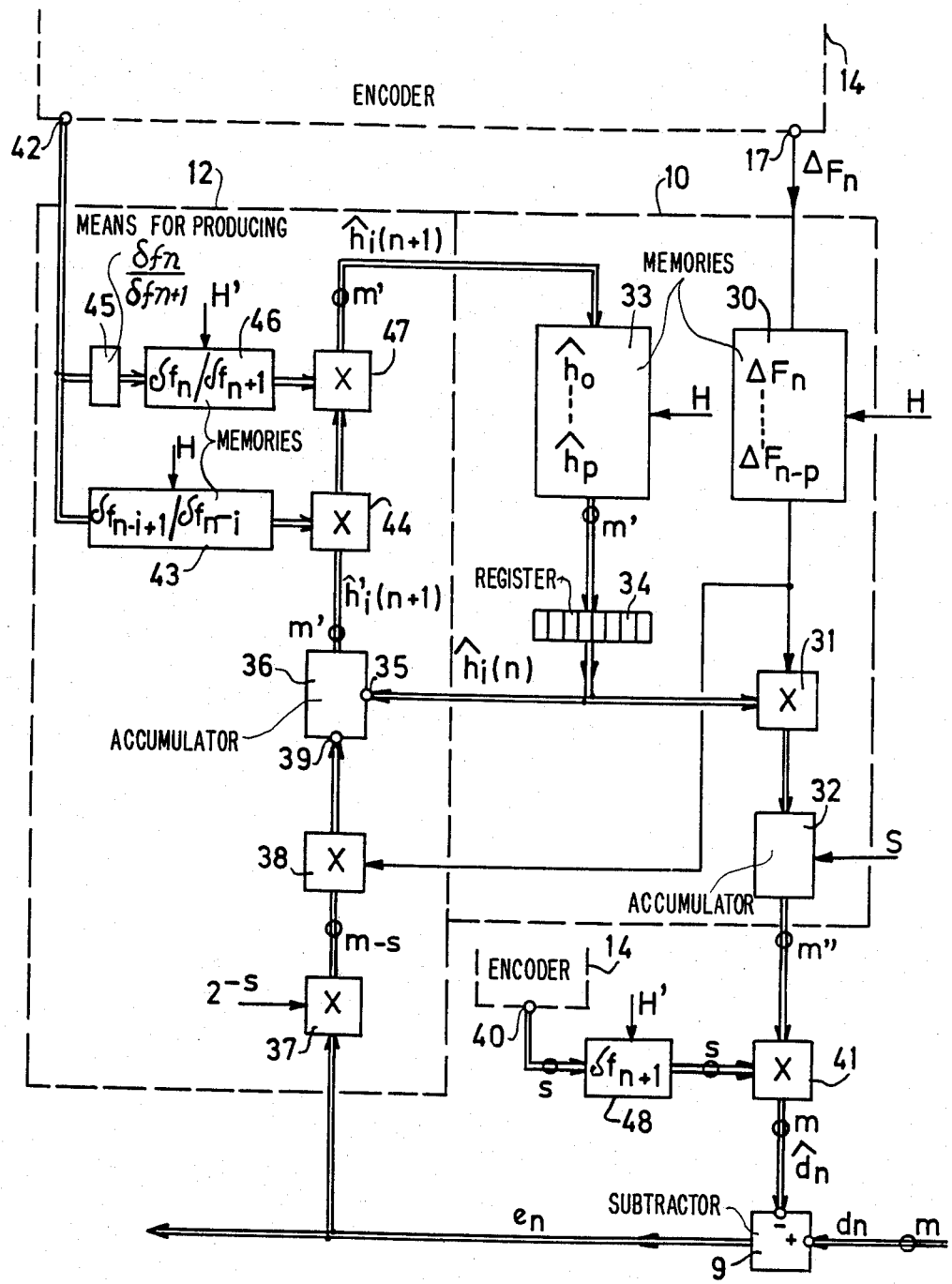
FIG. 6 shows a diagram of an embodiment of the transversal filter and of the coefficients adjusting circuit for the echo canceller in FIG. 5.

FIG. 6 shows a diagram, in accordance with the implementation in FIG. 4, of the filter 10 and of the adjusting circuit 12 provided with the modifications required in the case of a variable encoding step. The modifications of the adjusting circuit 12 relate to the processing of coefficients supplied by the accumulator 36 before being written into the memory 33.

As explained in connection with FIG. 4, the accumulator 36 receives at its input 35 during each sampling period T the $p+1$ coefficients $\hat{h}_i(n)$ to be adjusted and at its output 39 the corresponding modifying terms, and supplies the coefficients $\hat{h}_i'(n+1)$ defined by formula (10). These coefficients $\hat{h}_i'(n+1)$ have to be corrected in conformity with equation (11) in order to supply the "true" values $\hat{h}_i(n+1)$ of the coefficients to be stored in the memory 33. For that purpose the coefficients adjusting circuit 12 contains a memory 43 whose input is connected to the output 42 of the encoder 14 and which stores the $(p+1)$ last values of $$\frac{\delta f_{n-i+1}}{\delta f_{n-i}}$$

in the form of numbers equal to $1+K.2^{-x}$ where $K = -1, 0, +1$. These $(p+1)$ numbers are read during a sampling period T with the aid of the control signal H of frequency $(p+1)/T$ in order to be applied to an input of a multiplier 44 whose other input receives the coefficients $\hat{h}'(n+1)$ leaving the accumulator 36. On the other hand, the output 42 of the encoder 14 which supplies at the instant $(n+1)T$ the encoded value of $$\frac{\delta f_{n+1}}{\delta f_n}$$

is connected to a circuit 45 which supplies the encoded value of $$\frac{\delta f_n}{\delta f_{n+1}}$$

to be stored in a memory 46 in the form of a number equal to $1+K'.2^{-x}$ where $K' = -1, 0, +1$. This memory is read by a command signal H' of frequency $1/T$ in order that the encoded value of $$\frac{\delta f_n}{\delta f_{n+1}}$$

will appear during the whole of a sampling period T at an input of a multiplier 47 whose other input is connected to the output of the multiplier 44. The multiplier 47 thus applies the filter coefficients $\hat{h}_i(n+1)$ corrected in accordance with formula (11) and to be stored in the memory 33. As explained, the multiplications in multipliers 44 and 47 are very easy to implement with the type of encoding used.

Another modification to be made relates to a multiplication of the signal leaving the accumulator 32 (and constituting the output signal of the transversal filter 10) by the variable step signal. For that purpose, the variable-step signal $\delta f_n$ available at the output 40 of the encoder 14 in the form of a number of s bits is written into a memory 48. It is read from this memory by means of the command signal H' of frequency 1/T and remains applied without any change to an input of the multiplier 41 during the whole of a sampling period T. For consistency with the explanations given with regard to the adjusting circuit 12, it is the step $\delta f_{n+1}$ that is applied to the multiplier 41. Applied to the other input of this multiplier 41 is the signal of m" bits supplied by the accumulator 32. The signal of the product supplied by the multiplier 41 is rounded off to m bits in order to form the estimated differential echo signal $\hat{d}_n$ applied to the negative terminal of the subtractor 9.

Another method referred to as "statistical", which differs from that using the gradient algorithm, makes it possible to calculate directly the coefficients of the transversal filter 10 without proceeding by successive iterations as hitherto described. This method, which is generally less exact but is faster, can supply approximate values of the coefficients that may serve for example as initial coefficient values for a more precise echo canceller operating on the basis of successive iterations.

First of all, an explanation will be given of the theoretical background of this method in the case where the echo canceller of the invention works with a constant encoding step $\delta f$.

In the embodiment shown in FIG. 1, the object of the method, using the same notations as already given, is to calculate the coefficients $\hat{h}_0, \hat{h}_1 \ldots \hat{h}_p$ of the filter as approximate values of $h_0\delta f, h_1\delta f, \ldots h_p.\delta f$.

Along lines similar to those used for formula (2) one can express the differences $d_n, d_{n-1}, \ldots d_{n-q}$ between two successive samples of the echo signal at (q+1) successive sampling instants $nT, (n-1)T, \ldots (n-q)T$, where q<p. One obtains:

$$\begin{cases} d_n = \Delta F_n (h_0\delta f) + \Delta F_{n-1} (h_1 \cdot \delta f) + \ldots \\ \quad + \Delta F_{n-p} (h_p \cdot \delta f) \\ d_{n-1} = \Delta F_{n-1} (h_0\delta f) + \Delta F_{n-2} (h_1 \cdot \delta f) + \ldots + \\ \Delta F_{n-p-1} (h_p \cdot \delta f) \\ \vdots \\ d_{n-q} = \Delta F_{n-q} (h_0 \cdot \delta f) + \Delta F_{n-q-1} (h_1 \cdot \delta f) + \ldots + \\ \Delta F_{n-p-q} (h_p \cdot \delta f) \end{cases} \quad (13)$$

If the two members of the (q+1) equations (13) are multiplied respectively by $\Delta F_n, \Delta F_{n-1} \ldots \Delta F_{n-q}$ and if a member-for-member sum is made of these equations, it is easy to see that, using the variable j as an integer varying from 0 to q, one obtains:

$$\begin{aligned} \sum_{j=0}^{q} d_{n-j} \cdot \Delta F_{n-j} &= (h_0 \cdot \delta f) \sum_{j=0}^{q} |\Delta F_{n-j}|^2 \\ &+ (h_1 \cdot \delta f) \sum_{j=0}^{q} \Delta F_{n-j} \cdot \Delta F_{n-j-1} \\ &\vdots \\ &+ (h_p \cdot \delta f) \sum_{j=0}^{q} \Delta F_{n-j} \cdot \Delta F_{n-j-p} \end{aligned} \quad (14)$$

With regard to the second member of this equation (14) the following observations may be made:

As the terms $\Delta F_{n-j}$ have the values +1 or −1, one has $|\Delta F_{n-j}| = 1$ and thus the factor of the term $(h_0.\delta f)$ is equal to q+1.

The factors of the other terms $(h_1.\delta f) \ldots (h_p.\delta f)$ may be written quite generally for a given term $(h_k.\delta f)$ with k an integer going from 1 to p as:

$$C_k^0 = \sum_{j=0}^{q} \Delta F_{n-j} \cdot \Delta F_{n-j-k}. \quad (15)$$

This expression represents the correlation function calculated for q+1 samples, of two series of samples of the delta-encoded signal shifted by k sampling periods. A characteristic of delta encoding is that, for most of the shifts such that k>4, the correlation function $C_k^0$ is quasizero whereas for weaker shifts (k≦4) the value of $C_k^0$ is different from zero.

If one nevertheless assumes that $C_k^0=0$ for all values of k going from 1 to p, equation (14) may reduce to:

$$(h_0\delta f) = \frac{1}{q+1} \sum_{j=0}^{q} d_{n-j} \cdot \Delta F_{n-j} \quad (16)$$

By a procedure similar to that leading to this relation (16) one can calculate the other terms $(h_1.\delta f) \ldots (h_p.\delta f)$. The general term $(h_i.\delta f)$ (i integer going from 0 to p) may be written in the form:

$$(h_i \cdot \delta f) = \frac{1}{q+1} \sum_{j=0}^{q} d_{n-j} \cdot \Delta F_{n-j-i} \quad (17)$$

on the assumption that the correlation function $$C_k^i = \sum_{j=0}^{q} \Delta F_{n-j} \cdot \Delta F_{n-j-k} \quad (18)$$

is zero for all integer values of k differing from i and going from 0 to p.

In the "statistical" method that may be implemented to determine the coefficients of the transversal filter of the echo canceller, it is assumed that this hypothesis has been verified. This method consists in calculating these (p+1) coefficients $\hat{h}_i$ as the second member of equation (17) in which integer i is made to vary from 0 to p, these calculated coefficients being the approximate values of the terms $(h_i.\delta f)$, in which $h_i$ represents the samples of the impulse response of the echo path.

Thus, in the echo canceller of the invention using this method, the coefficients adjusting circuit 12 must be arranged, on the basis of samples $d_{n-j}$ of the differential echo signal and of samples $\Delta F_{n-i-j}$ of the delta-encoded signal, to form the convolution products $z_i$ such that:

$$z_i = \sum_{j=0}^{q} d_{n-j} \cdot \Delta F_{n-i-j} \qquad (19)$$

The coefficients $\hat{h}_i$ of the transversal filter are determined by:

$$\hat{h}_i = z_i/q+1 \qquad (20).$$

On the basis of the filter coefficients $\hat{h}_i$ calculated in this way, the output signal of filter 10, $\hat{d}_n$, may be calculated in accordance with equation (3) which may be written:

$$\hat{d}_n = \sum_{i=0}^{p} \Delta F_{n-i} \cdot \hat{h}_i \qquad (21)$$

FIG. 7 represents an embodiment of an echo canceller implementing the method just described. As in the echo canceller of FIG. 1, the delta encoder 14 encodes the signal f(t) applied to the send path 1 and supplies at its output 17 the samples $\Delta F_n$ of the delta-encoded signal that are applied to the input 11 of the transversal filter 10, and at its output 20 the locally decoded signal, that is to say the result of the integration of the series of samples $\Delta F_n \cdot \delta f$. In the send path 7, the difference-forming circuit 22 supplies the differential echo signal $d_n = g_n - g_{n-1}$ which is applied to the positive terminal of the subtractor 9. The estimated differential echo signal $\hat{d}_n$ supplied by the transversal filter 10 is applied to the negative terminal of the subtractor 9 which supplies the signal $e_n = d_n - \hat{d}_n$. In the "statistical" method implemented in the echo canceller of FIG. 7, it is the differential echo signal $d_n$ that is used in the adjusting circuit 12 for adjusting the coefficients $\hat{h}_i$ of the filter, as results from the equations (19) and (20).

In the embodiment represented here the transversal filter 10 contains a delay circuit 50 receiving the delta-encoded signal $\Delta F_n$ and producing a delay qT. A memory 51 of the filter arranged as a shift register in which the signal is shifted at the frequency 1/T, is capable of storing (p+1) consecutive samples of the signal leaving the delay circuit 50. As pT is equal to the duration of the impulse response of the echo path, one may choose q in such a way that $(p+1)=(r+1)(q+1)$, where r is an integer. The shift register constituting the memory 51 is thus formed from (r+1) cascaded elementary shift registers 51-0 to 51-r each comprising (q+1) elements. Indicated in these registers are the samples that are present at the instant nT when the sample $\Delta F_n$ is introduced at the input of the delay circuit 50: the first register 51-0 contains the preceding samples $\Delta F_{n-q}$ to $\Delta F_{n-2q}$; the second register 51-1 contains the preceding samples $\Delta F_{n-2q-1}$ to $\Delta F_{n-3q-1}$; the last register 51-r contains the preceding samples $\Delta F_{n-(r+1)q-r}$ to $\Delta F_{n-(r+2)q-r}$.

For calculating the coefficients $\hat{h}_i$ of the filter using equations (19) and (20), the coefficients adjusting circuit 12 contains a memory 52 to store (q+1) consecutive samples of the signal $d_n$ supplied by the circuit 22. Through the intermediary of an interruptor 53 controlled by a command signal S, which keeps it closed until the instant nT and open during the following time interval qT, a memory 52 remains filled from the instant nT up to the instant (n+q)T by the same samples $d_n$ to $d_{n-q}$ as indicated in the figure.

The terms $z_i$ of equation (19) are calculated in accordance with a certain time division during a calculating period extending from the instant nT up to the instant (n+q)T. For this calculation, use is made of (r+1) calculation means 54-0 to 54-r which are each organised, in a known manner, for calculating at each sampling instant of the calculating period one of the terms $z_i$ in conformity with equation (19). These calculation means are connected on the one hand to the memory 52 in order to receive during the calculating period the same samples $d_n$ to $d_{n-q}$. The calculation means 54-0 to 54-r are connected on the other hand respectively to the shift registers 51-0 to 51-r for receiving the samples present in these registers, shifted at the rate 1/T. These links to the calculation means 54-0 to 54-r are shown as double lines to indicate that they each transport (q+1) samples.

At the instant nT, the first instant of the calculating period, it is easy to see from the samples indicated in the registers that the calculation means 54-0 to 54-r supply respectively the terms $z_q$ to $z_{(r+1)q+r}$, or $z_q$ to $z_p$.

At the next instant (n+1)T, the samples present in the registers having been shifted by one bit, the calculation means 50-0 to 54-r supply respectively the terms $z_{q-1}$ to $z_{p-1}$.

The procedure continues up to the last sampling instant of the calculating period, (n+q)T. At this instant, the samples present in the registers having been shifted by q bits, the calculation means 54-0 to 54-r supply respectively the terms $z_0$ to $z_{p-q}$. Thus, during the entire calculating period the calculation means 54-0 to 54-r have together supplied the (p+1) terms $z_i$ going from $z_0$ to $z_p$.

To form the desired coefficients $\hat{h}_i$ in accordance with equation (19), the outputs of the calculation means 54-0 to 54-r are provided with multipliers 55-0 to 55-r for multiplying the terms $z_i$ by 1/(q+1), which corresponds to a simple bit-shifting if (q+1) is a power of two.

The coefficients $\hat{h}_q \ldots \hat{h}_0$ supplied successively by the multiplier 55-0 during the calculating period are stored in a coefficient memory 56-0 of the filter 10. The coefficients $\hat{h}_{2q+1} \ldots \hat{h}_{q+1}$ supplied successively by the multiplier 55-1 are stored in a coefficient memory 56-1. Finally the coefficients $\hat{h}_p \ldots \hat{h}_{p-q}$ supplied successively by the multiplier 55-r are stored in a coefficient memory 56-r.

At the end of the calculating period, that is at the instant (n+q)T, there are thus present in the set of memories 56-0 to 56-r all the calculated coefficients $\hat{h}_i$. Starting from the next sampling instant (n+q+1)T the calculation of the samples of the estimated residual echo signal $\hat{d}_n$ can begin on the basis of these calculated coefficients $\hat{h}_i$ and the samples of the signal $\Delta F_n$ present in the shift registers 51-0 to 51-r. This calculation is done by means of a calculating device 57 which is connected by multiple links, represented by double lines, to the registers 51-0 to 51-r and to the memories 56-0 to 56-r and which is arranged, in a known manner, so as to form in accordance with equation (21) the samples of the signal $\hat{d}_n$, constituting the output signal of filter 10.

One might also use the calculated coefficients $\hat{h}_i$ as initial coefficients in an echo canceller in which the coefficients are modified by successive iterations, for example, in the echo canceller described with the aid of FIG. 1. The ideal value of the coefficients of this echo canceller, like that of the calculated coefficients $\hat{h}_i$, has the form $h_i \cdot \delta f$, where $h_i$ represents the impulse response of the echo path and $\delta f$ is the encoding step. If the echo canceller operating by successive iterations requires coefficients whose ideal value is $h_i$, the calculated coefficients will be divided by the encoding step $\delta f$.

The calculation of the coefficients by the "statistical" method as described in the foregoing may also be applied to cases where a delta encoder may be used with a fixed encoding step $\delta f$, that is to say as envisaged for example in the foregoing, when it is possible to limit the dynamic range of the signal applied to the encoder.

In the case where the delta encoder uses a variable encoding step, the equations (13) used as the basis for explaining the "statistical" method may be written as follows, calling $\delta f_n, \delta f_{n-1}, \ldots \delta f_{n-p}$ the values of the encoding step at the instants $nT, (n-1)T \ldots (n-p)T$:

$$\begin{cases} d_n = \Delta F_n(h_0 \cdot \delta f_n) + \Delta F_{n-1}(h_1 \cdot \delta f_{n-1}) + \ldots + \Delta F_{n-p}(h_p \cdot \delta f_{n-p}) \\ d_{n-1} = \Delta F_{n-1}(h_0 \cdot \delta f_{n-1}) + \Delta F_{n-2}(h_1 \cdot \delta f_{n-2}) + \ldots + \Delta F_{n-p-1}(h_p \cdot \delta f_{n-p-1}) \\ \vdots \\ d_{n-q} = \Delta F_{n-q}(h_0 \cdot \delta f_{n-q}) + \Delta F_{n-q-1}(h_1 \cdot \delta f_{n-q-1}) + \ldots + \Delta F_{n-p-q}(h_p \cdot \delta f_{n-p-q}) \end{cases} \quad (22)$$

Consider now the practical case where the encoding step varies at a syllabic rhythm. In that case, q may be chosen in such a way that during a time interval qT the encoding step may validly be considered as fixed. One may then write:

$$\begin{cases} \delta f_n = \delta f_{n-1} = \ldots \delta f_{n-q} \\ \delta f_{n-1} = \delta f_{n-2} = \ldots \delta f_{n-q-1} \\ \vdots \\ \delta f_{n-p} = \delta f_{n-p-1} = \ldots \delta f_{n-p-q} \end{cases} \quad (23)$$

Equations (22) may then be written:

$$\begin{cases} d_n = \Delta F_n(h_0 \cdot \delta f_n) + \Delta F_{n-1}(h_1 \cdot \delta f_{n-1}) + \ldots + \Delta F_{n-p}(h_p \cdot \delta f_{n-p}) \\ d_{n-1} = \Delta F_{n-1}(h_0 \cdot \delta f_n) + \Delta F_{n-2}(h_1 \cdot \delta f_{n-1}) + \ldots + \Delta F_{n-p-1}(h_p \cdot \delta f_{n-p}) \\ \vdots \\ d_{n-q} = \Delta F_{n-q}(h_0 \cdot \delta f_n) + \Delta F_{n-q-1}(h_1 \cdot \delta f_{n-1}) + \ldots + \Delta F_{n-q-p}(h_p \cdot \delta f_{n-p}). \end{cases} \quad (24)$$

Assuming that the correlation $C_k^i$ given by equation (18) is zero, it can be shown that the general term $h_i \cdot \delta f_{n-1}$ (i is going from 0 to p) may be expressed in the following form, to be compared with formula (17):

$$h_i' \cdot \delta f_{n-i} = \frac{1}{q+1} \sum_{j=0}^{q} d_{n-j} \cdot \Delta F_{n-j-i} \quad (24)??$$

Two cases may be encountered:

In the one case, the duration pT of the impulse response of the echo path is less than or equal to the duration qT during which the encoding step may validly be considered as fixed. One may then write $\delta f_{n-1} = \delta f$, whatever may be the value of i going from 0 to p, which reduces to the case envisaged In calculating the coefficients $\hat{h}_i$ of the transversal filter using equations (19) and (20) one obtains coefficients whose ideal value $h_i \cdot \delta f$ does not depend on variations in the encoding step during the period pT.

In the other case, one has $pT > qT$ and the coefficients of the transversal filter calculated using equations (19) and (20) have an ideal value $h_i \cdot \delta f_{n-1}$ depending on the variations of the encoding step $\delta f_{n-1}$ during the period pT of the impulse response of the echo path. If the coefficients calculated using equations (19) and (20) are called $\hat{h}_i$, one may correct these coefficients $\hat{h}_i$ in order to obtain the "true" coefficients $\hat{h}_i$ by carrying out the operation:

$$\hat{h}_i = \hat{h}_i \cdot \frac{\delta f_n}{\delta f_{n-i}}.$$

In the two cases envisaged above, use may be made of the transversal filter 10 and of the adjusting circuit 12 described in FIG. 7. If one desires to correct the coefficients calculated taking into account variations in the encoding step, the encoder 14 must contain a supplementary output supplying the (p+1) ratios $$\frac{\delta f_n}{\delta f_{n-i}},$$

while the adjusting circuit 12 must contain a supplementary memory to store these ratios, as well as supplementary multiplication means in order to multiply the calculated coefficients $h_i$ by the corresponding ratios $$\frac{\delta f_n}{\delta f_{n-i}}.$$

In the entire description of the echo canceller in accordance with the invention, the signal leaving the receive path and generating an echo in the send path has been taken to be a signal obtained by decoding the delta encoded signal necessarily existing in any type of delta encoder. It is evident, however, that one might also take the signal f(t) itself which enters the send path, of which the signal obtained by decoding the delta-encoded signal is only an "image". However, if one operated in that way the quality of the echo cancellation would be somewhat degraded, because the signals applied at the input of the echo path and at the input of the simulated echo path as constituted by the transversal filter would not have undergone a common processing, as in the other mode of operation, which means that the delta-encoding noise of the signal f(t) in the encoder 14 would be added to the residual differential echo signal $e_n = d_n - \hat{d}_n$; this encoding noise due to the delta encoder may not be negligible compared with the wanted residual differential echo signal $e_n = d_n - \hat{d}_n$.

What is claimed is:

1. Echo canceller, for cancelling an echo signal which appears as part of a send signal applied to a send path, the echo signal resulting from a received signal applied to a receive path, said echo canceller comprising:
   (a) a subtraction circuit having a first input coupled to receive a signal derived from the send signal, a second input, and an output for providing a new send signal from which the echo signal is substantially cancelled;
   (b) a transversal filter including:
      (i) an input coupled to receive a signal derived from the received signal;
      (ii) an output coupled to the second input of the subtraction circuit; and
      (iii) means for adjusting filter coefficients so that the echo signal is substantially cancelled at the output of the subtraction circuit;
   wherein the improvement comprises:
   (c) a delta encoder for encoding, at a sampling rate 1/T, the received signal and for supplying, to the input of the transversal filter, bits of a delta-encoded signal derived from the received signal;
   (d) a difference-forming circuit for forming, at said sampling rate 1/T, a difference signal between values of two consecutive samples of the send signal and for supplying the difference signal to the first input of the subtraction circuit; and
   (e) an integrating circuit for integrating the new send signal appearing at the output of the subtraction circuit and for supplying a resulting integrated signal at an output of the send path.

2. Echo canceller as claimed in claim 1, comprising:
   (a) a circuit for dividing, by an encoding step used in the delta encoder, the difference signal supplied by the difference-forming circuit, the dividing circuit applying a resulting quotient signal to the first input of the subtraction circuit; and
   (b) a circuit for multiplying, by said encoding step, said new send signal, the multiplying circuit applying a resulting product signal to an input of said integrating circuit.

3. Echo canceller as claimed in claim 1, comprising: a circuit for multiplying, by an encoding step used in the delta encoder, a signal appearing at the output of the transversal filter, the multiplying circuit applying a resulting product signal to the second input of the subtraction circuit.

4. Echo canceller as claimed in claim 1, wherein the filter coefficients adjusting means adjusts the coefficients by successive iterations at said sampling rate 1/T, in accordance with the iteration formula:

$$\hat{h}_i(n+1) = \hat{h}_i(n) + e_n \frac{\Delta F_{n-i}}{p+1}$$

where (a) i is an integer going from 0 to p, pT being the duration of the impulse response of a path of the echo signal;
(b) $\hat{h}_i(n)$ are the filter coefficients to be adjusted at an instant nT;
(c) $\hat{h}_i(n+1)$ are adjusted filter coefficients utilisable at the instant (n+1)T;
(d) $e_n$ is the value of the new send signal supplied by the subtraction circuit at the instant nT; and
(e) $\Delta F_{n-i}$ are the values of the bits of the delta-encoded signal, stored in the transversal filter and entered into this filter at the instants (n-i)T.

5. Echo canceller as claimed in claim 1, wherein the filter coefficients adjusting means of the transversal filter adjusts the coefficients of the filter in accordance with the expression:

$$\hat{h}_i = \frac{1}{q+1} \sum_{j=0}^{q} d_{n-j} \cdot \Delta F_{n-j-i}$$

where:

(a) i is an integer going from 0 to p, pT being the duration of the impulse response of a path of the echo signal;
(b) q is an integer such that q<p,
(c) $d_{n-j}$ are the values of the difference signal supplied by the difference-forming circuit at the instants (n-j)T;
(d) $\Delta F_{n-j-i}$ are the values of the bits of the delta-encoded signal stored in the filter and entered into the filter at the instants (n-j-i)T; and
(e) the $\hat{h}_i$ are the coefficients of the filter.

6. Echo canceller as claimed in claim 1, wherein:
(a) said echo signal results from acoustic coupling between a loudspeaker and a microphone;
(b) the receive path is provided with means for controlling dynamic range, said controlling means being coupled before the delta encoder; and
(c) the delta encoder is of the fixed-step encoding type;
the echo canceller further comprising
(d) a variable-gain amplifier is coupled with an output of the receive path.

7. The echo canceller of claim 1 comprising means for decoding the bits of the delta-encoded signal, said decoding means being coupled, in the receive path, to provide a decoded signal at an output of the receive path.

8. The echo canceller of claim 2 wherein:
(a) said delta encoder uses a respective variable encoding step of value δfn at each respective instant nT;
(b) said filter coefficients adjusting means adjusts the filter coefficients by successive iterations, at said sampling rate 1/T, in accordance with the iteration formula $$\hat{h}_i(n+1) = \left[ \hat{h}_i(n) + e_n \frac{\Delta F_{n-i}}{p+1} \right] \cdot \frac{\delta f_{n-i+1}}{\delta f_{n-i}} \cdot \frac{\delta f_n}{\delta f_{n+1}}$$

where:

(i) i is an integer going from 0 to p, pT being the duration of the impulse response of a path of the echo signal;
(ii) $\hat{h}_i(n)$ are the filter coefficients to be adjusted at an instant nT;

(iii) $\hat{h}_i(n+1)$ are adjusted filter coefficients utilisable at the instant $(n+1)T$;
(iv) $e_n$ is the value of the new send signal supplied by the subtraction circuit at the instant $nT$;
(v) $\Delta F_{n-i}$ are the values of the bits of the delta-encoded signal, stored in the transversal filter and entered into this filter at the instants $(n-i)T$; and
(vi) $\delta f_n$, $\delta f_{n+1}$, $\delta f_{n-i}$, and $\delta f_{n-i+1}$, are the values of the respective encoding steps at the respective instants $nT$, $(n+1)T$, $(n-i)T$, and $(n-i+1)T$.

9. Echo canceller as claimed in claim 8, characterized in that, for simplifying the adjustment of the coefficients, ratios $$R_i = \frac{\delta f_{n-i+1}}{\delta f_{n-i}}$$

are encoded in such a way that:

$R_i = 1 + K \cdot 2^{-x}$ with $K = 0$ if $1 - 2^{-x} \leq R_i \leq 1 + 2^{-x}$
$K = 1$ if $R_i > 1 + 2^{-x}$
$K = -1$ if $R_i < 1 - 2^{-x}$ x being an integer sufficiently large for $2^{-x}$ to be small with respect to 1, the ratio $$\frac{\delta f_n}{\delta f_{n+1}}$$

being encoded using $R_i$, where $i=0$.

10. Echo canceller as claimed in claim 8, comprising:
(a) memory means for storing $p+1$ values of the ratio $$R_i = \frac{\delta f_{n-i+1}}{\delta f_{n-i}},$$

and of the ratio $$\frac{\delta f_n}{\delta f_{n+1}};$$

and
(b) means for multiplying, during each sampling period T, $p+1$ coefficients formed in accordance with the iteration formula $$\hat{h}_i(n+1) = \hat{h}_i(n) + e_n \frac{\Delta F_{n-i}}{p+1}$$

by the ratios $$R_i \frac{\delta f_{n-i+1}}{\delta f_{n-i}} \text{ and } \frac{\delta f_n}{\delta f_{n+1}}.$$

11. Echo canceller as claimed in claim 8, characterized in that the values of the encoding step are PCM-encoded in order to be used in a local decoder present in the delta encoder, in the filter coefficients adjusting means, in said circuit for multiplying by the encoding step, and in said circuit for dividing by the encoding step.

12. The echo canceller of claim 3 wherein:
(a) said delta encoder uses a respective variable encoding step of value $\delta fn$ at each respective instant $nT$;
(b) said filter coefficients adjusting means adjusts the filter coefficients by successive iterations, at said sampling rate $1/T$, in accordance with the iteration formula $$\hat{h}_i(n+1) = \left[\hat{h}_i(n) + e_n \frac{\Delta F_{n-i}}{p+1}\right] \cdot \frac{\delta f_{n-i+1}}{\delta f_{n-i}} \cdot \frac{\delta f_n}{\delta f_{n+1}}$$

where:
(i) i is an integer going from 0 to p, pT being the duration of the impulse response of a path of the echo signal;
(ii) $\hat{h}_i(n)$ are the filter coefficients to be adjusted at an instant $nT$;
(iii) $\hat{h}_i(n+1)$ are adjusted filter coefficients utilisable at the instant $(n+1)T$;
(iv) $e_n$ is the value of the new send signal supplied by the subtraction circuit at the instant $nT$;
(v) $\Delta F_{n-i}$ are the values of the bits of the delta-encoded signal, stored in the transversal filter and entered into this filter at the instants $(n-i)T$; and
(vi) $\delta f_n$, $\delta f_{n+1}$, $\delta f_{n-i}$, and $\delta f_{n-i+1}$, are the values of the respective encoding steps at the respective instants $nT$, $(n+1)T$, $(n-i)T$, and $(n-i+1)T$.

13. Echo canceller as claimed in claim 12, characterized in that, for simplifying the adjustment of the coefficients, ratios $$R_i = \frac{\delta f_{n-i+1}}{\delta f_{n-i}}$$

are encoded in such a way that:

$R_i = 1 + K \cdot 2^{-x}$ with $K = 0$ if $1 - 2^{-x} \leq R_i \leq 1 + 2^{-x}$
$K = 1$ if $R_i > 1 + 2^{-x}$
$K = -1$ if $R_i < 1 - 2^{-x}$ x being an integer sufficiently large for $2^{-x}$ to be small with respect to 1, the ratio $$\frac{\delta f_n}{\delta f_{n+1}}$$

being encoded using $R_i$, where $i=0$.

14. Echo canceller as claimed in claim 12, comprising:
(a) memory means for storing $p+1$ values of the ratio $$R_i = \frac{\delta f_{n-i+1}}{\delta f_{n-i}},$$

and of the ratio $$\frac{\delta f_n}{\delta f_{n+1}};$$

and (b) means for multiplying, during each sampling period T, p+1 coefficients formed in accordance with the iteration formula $$\hat{h}_i(n+1) = \hat{h}_i(n) + e_n \frac{\Delta F_{n-i}}{p+1}$$

by the ratios $$R_i \frac{\delta f_{n-i+1}}{\delta f_{n-i}} \text{ and } \frac{\delta f_n}{\delta f_{n+1}}.$$

15. Echo canceller as claimed in claim 12, characterized in that the values of the encoding step are PCM-encoded in order to be used in a local decoder present in the delta encoder, in the filter coefficients adjusting means, and in said circuit for multiplying by the encoding step.

16. Echo canceller as claimed in claim 5, wherein:
(a) the delta encoder uses a variable encoding step;
(b) the filter coefficient adjusting means adjusts the filter coefficients using a value of q which is such that, during an interval of time qT, the encoding step may be considered as substantially fixed; and
(c) the filter coefficients adjusting means comprises means for multiplying the filter coefficients calculated in accordance with the expression $$\hat{h}_i = \frac{1}{q+1} \sum_{j=0}^{q} d_{n-j} \cdot \Delta F_{n-j-i}$$

by $$\frac{\delta f_n}{\delta f_{n-i}}$$

to provide more precise filter coefficients, $\delta f_n$ and $\delta f_{n-i}$ being the values of the encoding step at the respective instants nT and (n−i)T.

17. Echo canceller as claimed in claim 16 comprising a memory for storing p+1 values of the ratio $$\frac{\delta f_n}{\delta f_{n+1}}$$

and for providing the p+1 values of the ratio to the multiplying means.

18. The echo canceller of claim 5 wherein the transversal filter comprises:
(a) a delay circuit, of delay qT, coupled to receive the bits of the delta-encoded signal from the delta encoder;
(b) a memory coupled to receive the bits of the delta-encoded signal from the delay circuit, the memory being formed from (r+1) shift registers, shifted at the sampling rate 1/T, r being an integer such that (p+1)=(r=1) (q+1);
(c) the filter coefficients adjusting means including:
(i) a memory for storing the values $d_{n-j}$ of the difference signal during a period of calculation which extends from instant nT to instant (n+q)T;
(ii) (r+1) calculation means, each said calculation means having a first respective input coupled to a respective one of said (r+1) shift registers and a second respective input coupled to receive the values $d_{n-j}$ from the memory of the filter coefficients adjusting means, each said calculation means being for calculating, at each sampling instant in the period of calculation, a convolution product of the values $d_{n-j}$ and the values of the bits stored at each sampling instant in the respective shift register; and
(iii) means for multiplying each convolution product by 1/(q+1) to form the filter coefficients.

19. The echo canceller of claim 18, comprising first, second and third calculation means, so that $r+1=3$, the convolution products supplied, and orginating respectively from the first, second, and third calculation means, being successively $\hat{h}_q$ to $\hat{h}_o$, $\hat{h}_{2q+1}$ to $\hat{h}_{q+1}$, and $\hat{h}_p$ to $\hat{h}_{p-q}$.

20. The echo canceller of claim 7 wherein the decoding means is a local decoder disposed within the delta encoder.

21. The echo canceller of claim 7 comprising a filter coupled to an output of the decoding means, the filter cutting off frequencies higher than an upper limit frequency of a frequency band of the received signal.

* * * * *